United States Patent [19]

Warrington et al.

[11] Patent Number: 5,423,566
[45] Date of Patent: Jun. 13, 1995

[54] ADJUSTABLE TRAILER HITCH

[75] Inventors: Bruce D. Warrington, 32742 Alipaz, #80, San Juan Capistrano, Calif. 92675; Teddie R. McCaa, Bakersfield, Calif.

[73] Assignee: Bruce D. Warrington, San Juan Capistrano, Calif.

[21] Appl. No.: 112,613

[22] Filed: Aug. 26, 1993

[51] Int. Cl.$^6$ .............................. B60D 1/52; B60R 9/10
[52] U.S. Cl. ..................... 280/415.1; 224/420.03 B; 224/42.03 R; 224/42.07; 224/42.45 R; 280/491.5; 280/504
[58] Field of Search ................ 280/415.1, 477, 478.1, 280/491.1, 491.5, 504, 506, 508, 416.1; 224/42.03 B, 42.03 R, 42.07, 42.45, 30 R, 31, 32 R, 32 A, 36, 39

[56] References Cited

U.S. PATENT DOCUMENTS

| | | |
|---|---|---|
| 2,838,327 | 6/1958 | Collins . |
| 3,271,050 | 9/1966 | Saunders . |
| 3,891,237 | 6/1975 | Allen . |
| 4,008,905 | 2/1977 | Soteropulos et al. . |
| 4,348,035 | 9/1982 | Wasservogel . |
| 4,856,686 | 8/1989 | Workentine ............. 224/42.07 |
| 5,251,494 | 10/1993 | Edwards ..................... 280/279 |
| 5,333,888 | 8/1994 | Ball ............................ 280/504 |

FOREIGN PATENT DOCUMENTS

| | | |
|---|---|---|
| 3800253 | 7/1989 | Germany . |
| 2235668 | 3/1991 | United Kingdom . |

*Primary Examiner*—Mitchell J. Hill
*Attorney, Agent, or Firm*—Merchant, Gould, Smith, Edell, Welter & Schmidt

[57] ABSTRACT

A wedge-shaped section is located near the top, near portion of a trailer hitch insert tube. The wedge-shaped segment is located opposite a complementary shaped section of the insert tube. The wedge-shaped section engages the insert tube to reduce or eliminate movement of a trailer hitch insert tube within a trailer hitch tube attached to a vehicle.

19 Claims, 2 Drawing Sheets

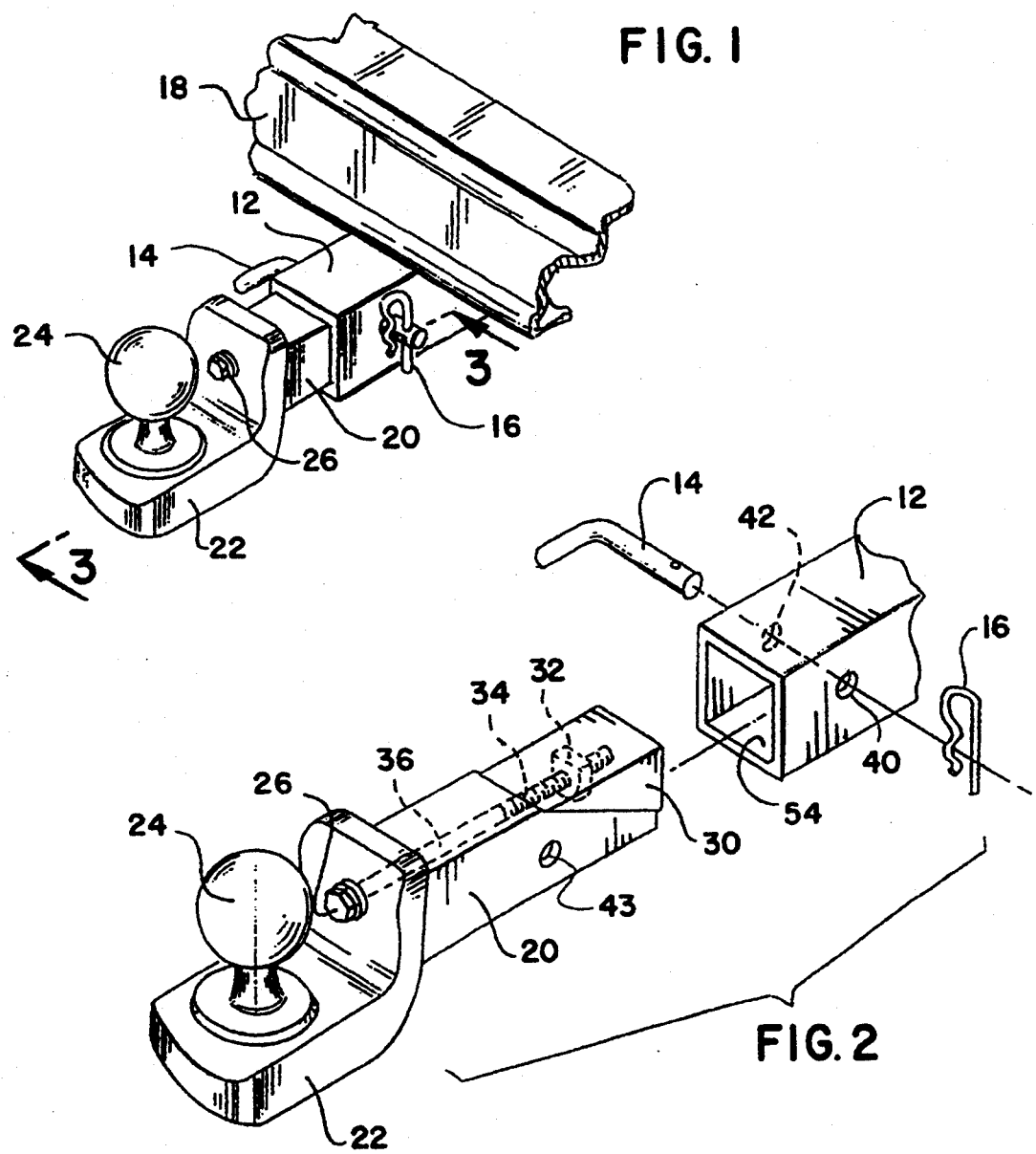
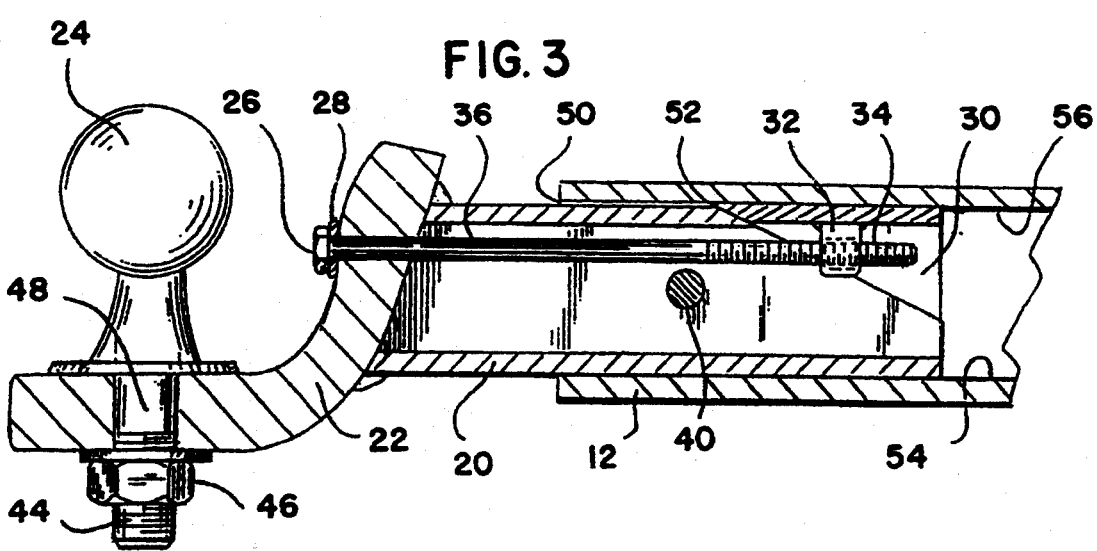

ADJUSTABLE TRAILER HITCH

FIELD OF THE INVENTION

The present invention relates to trailer hitches.

BACKGROUND OF THE INVENTION

There are a variety of trailer hitches and towing attachments in use in the marketplace today. A ball-type trailer hitch is fairly common and can be either permanently or temporarily-attached to the frame or bumper of a vehicle. Many boat trailers, camping trailers, and moving trailers employ a ball-type attachment.

A ball-type trailer hitch can be permanently attached to a motor vehicle by welding or bolting a tongue to the underside or frame of a motor vehicle, and mounting a 2-inch ball on the portion of the tongue that extends beyond the vehicle.

Alternatively, a ball-type trailer hitch may also be permanently attached to a vehicle by bolting or welding hollow tubing to the underside of a motor vehicle. Typically, a tube having inner dimensions of approximately 1½ or 2 inches by 1½–2 inches protrudes from beneath a vehicle. A second tube, having outer dimensions slightly smaller than the opening in the tube attached to the vehicle is inserted into the tube attached to the vehicle. A steel pin, or other suitable fastener, is fed through both sets of steel tubes and serves to hold the inserted tube in place. The pin is typically ½–1 inch in diameter. A ball-type trailer hitch is affixed to the protruding end of the inserted steel tubing, and provides a point of attachment for a trailer.

This type of trailer hitch is typically rated at about 500 lb. tongue weight, and a 10,000 lb. load.

The tube-type trailer hitch attachment has also been used to mount bicycle racks, motorcycle racks, and other carrying devices to a vehicle. The tube-type hitch attachment has become more popular in recent years because of the versatility in allowing a vehicle owner to install a single-style hitch which can accommodate a variety of carrying or towing needs. One disadvantage of the tube-type hitch attachment is the movement and consequent noise caused by the inserted tube shaking or vibrating within the surrounding tube.

In order to allow the inserted tube to be readily removed from the hitch assembly, it is necessary that the inserted tube be sufficiently smaller than the surrounding hitch tube. Otherwise, frictional forces acting upon the inner tube restrict its removal and thereby increases the burden of disengaging the towing assembly. Conversely, where the inner tube is sized to decrease the frictional force so that removal is facilitated, the inner tube may bounce within the outer tube thereby creating oscillation and noise or rattle. This rattle can be extremely distracting to the driver of the vehicle, especially if the driver is not familiar with the movement and noise commonly made by trailer hitches.

The movement and consequent rattle can cause the driver to pay excessive attention to the trailer, or other carrying apparatus inserted in the hitch tube. This distraction serves as both an annoyance and a danger to the driver, as the driver's full attention is no longer devoted to other vehicular traffic, road conditions, and pedestrian traffic. In fact, the rougher the road conditions, the more trailer hitch will tend to move and rattle because of the inertia developed by the apparatus attached to the inserted tube.

A need therefore exists for a trailer hitch insert tube which minimizes or eliminates movement and noise generated by the trailer hitch.

SUMMARY OF THE INVENTION

An advantage of the present invention is to provide a trailer hitch insert which eliminates movement and noise generated by a tube-type trailer hitch.

A further advantage of the present invention is to provide a means for immobilizing the inserted tube in a tube-type trailer hitch.

Yet a further advantage of the present invention is to provide a means for stabilizing and substantially immobilizing the apparatus attached to a vehicle by a tube-type trailer hitch.

Still a further advantage of the present invention is to provide a snug fitting trailer hitch attachment.

The present invention employs a wedge-shaped segment located on the tube to be inserted in a tube-type trailer hitch. The wedge-shaped section mates with a complementary portion of the inserted tube. The wedge-shaped section is drawn towards the opposite end of the insert tube by a fastener arrangement. The fastener arrangement causes the insert tube, wedge-shaped segment, and surrounding outer tube to form a press fit, substantially immobilizing the inner tube.

DESCRIPTION OF THE DRAWINGS

FIG. 1 is a perspective view showing a tube-type trailer hitch assembly in a fully assembled condition.

FIG. 2 is a perspective view of the insert tube of FIG. 1.

FIG. 3 is a lateral cross-sectional view of the tube-type trailer hitch illustrating the present invention.

DETAILED DESCRIPTION OF THE PREFERRED EMBODIMENT

Figure 4:
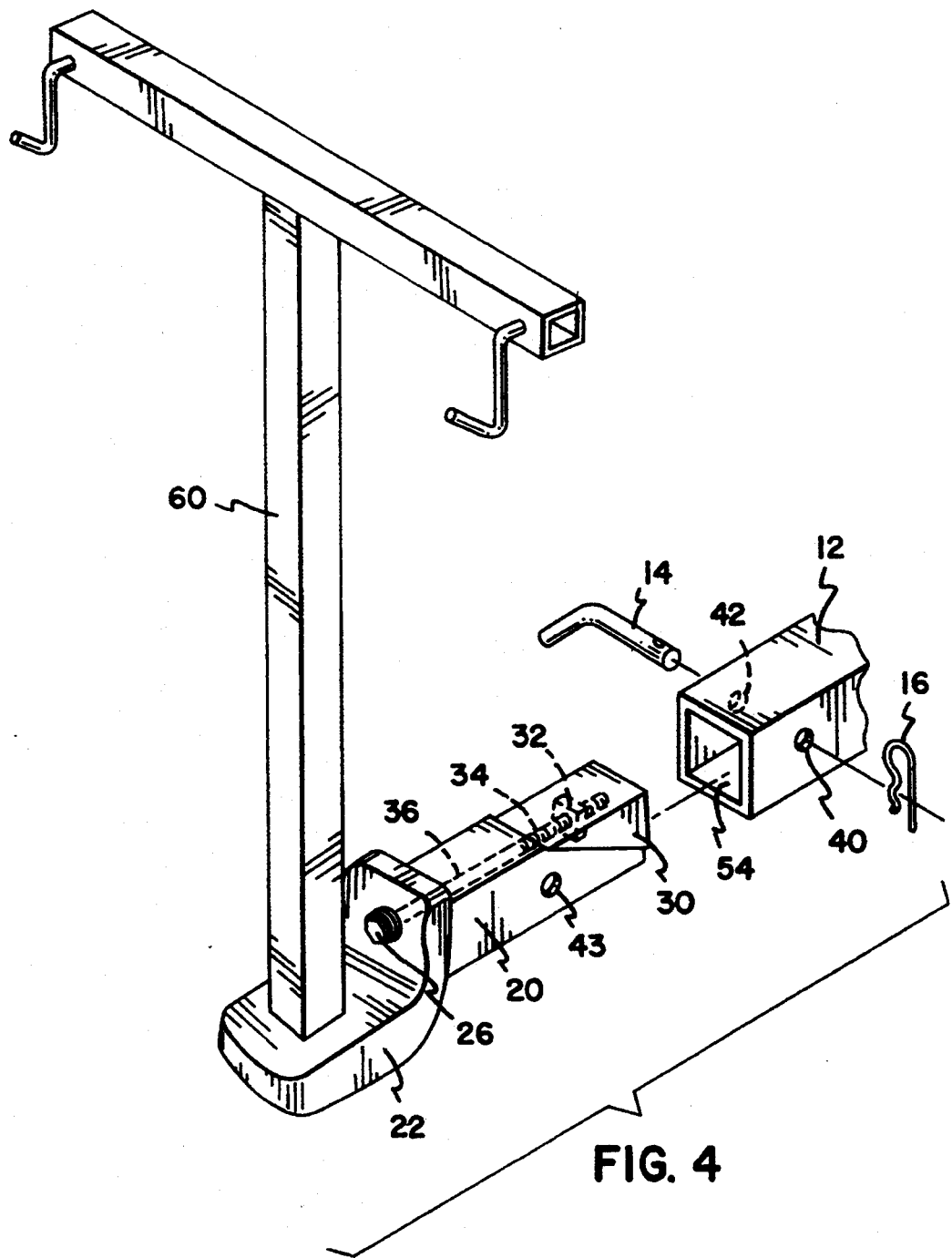
FIG. 4 is a perspective view of the insert tube showing a bicycle rack affixed thereon.

Referring to FIG. 1, an outer tube 12 is located beneath the bumper 18 of a vehicle (not shown). Trailer hitch tube 12 has an inside configuration 54 as shown in FIG. 2. Insert tube 20 has an outside configuration which complements the configuration of the inside configuration 54 of trailer hitch tube 12.

As shown in FIGS. 1–3, insert tube 20 is square, as is the inside configuration 54 of trailer hitch tube 12. It is recognized that rectangular or other configurations may be employed, however, it is believed that the square-type insert tube 20 is the most common in use today.

The insert tube 20 is initially held in place within the trailer hitch tube 12 by a steel pin 14. Steel pin 14 may be formed of stainless steel, iron, or other suitable material having a high shear strength to prevent insert tube 20 from being displaced from trailer hitch tube 12 when the vehicle either accelerates or decelerates. Pin 16 prevents steel pin 14 from being accidentally dislodged. Pin 16 may be a cotter pin, spring clip (as shown in FIGS. 1 and 2), cable tie, or other suitable fastener. Steel pin 14 is typically fed through holes 42 and 40 of the trailer hitch tube 12 as shown in FIG. 2. Matching holes in insert tube 20 are located adjacent to holes 42 and 40 in order to allow steel pin 14 to be properly assembled, as shown in FIG. 1.

A trailer ball 24 is attached to tongue 22. Tongue 22 is preferably welded or otherwise suitably attached to insert tube 20. Trailer ball 24 is preferably attached to tongue 22 by a solid shaft 48 which is attached to trailer ball 24 through a hole located in tongue 22. Trailer ball 234 is held in place by tightening nut 46 to a threaded segment 44 of shaft 48. One or more washers or compression washers may be located between bolt 46 and tongue member 22 in order to ensure that nut 46 is sufficiently tightened to hold trailer ball 24 in the desired position. In some configurations, trailer ball 24 may be welded to tongue 22. Yet other configurations are possible.

Referring to FIGS. 2 and 3, the present invention includes a wedge-shaped section 30 which is located toward the distal end of insert tube 20 from tongue 22 and trailer ball 24. The wedge-shaped section 30 engages with the insert tube 20 to restrict movement of the insert tube 20. In the preferred embodiment, the wedge-shaped section 30 is equipped with a threaded segment 32. Bolt 26 is fed through an opening in tongue 22. The threads 34 of bolt 26 are threaded through the threaded member 32 of wedge-shaped section 30. Threaded segment 32 may be a nut which is welded or braised or otherwise attached to the inside of wedge-shaped section 30. Threaded segment 32 must be sufficiently secured to wedge-shaped section 30 so that it will not be tightened. Threaded segment 32 may also be a separate, threaded insert, or may be an unthreaded hole with a nut or other threaded member suitably located to allow bolt 36 to be threaded into it such that wedge-shaped section 30 can be drawn towards the head 26 of bolt 36 as bolt 36 is tightened.

By tightening bolt 36, threaded segment 32 is drawn towards the head 26 of bolt 36. The movement of the wedge-shaped section 30 toward the insert tube 20 causes wedge-shaped section 30 to be similarly drawn towards the head 26 of bolt 36. Since wedge-shaped section 30 is positioned at an angle to the insert tube 20, wedge-shaped section 30 will slide along the surface of insert tube 20 until it encounters the inner surface of hitch tube 12.

When bolt 36 is tightened, the wedge-shaped segment 30 will become positioned as shown in FIG. 3. The leading edge 52 of wedge-shaped segment 30 will extend slightly past the mating edge of insert tube 20. A space or gap 50 will exist between the inner surface of trailer hitch tube 12 and insert tube 20. This gap 50 will vary depending on the exact dimensions of the insert tube 20 and trailer hitch tube 12 employed, but should be no more than 1/16 of an inch in the preferred embodiment. It is recognized that a larger gap 50 may be acceptable in a variety of applications, however, the present invention will result in more satisfactory operation if the gap 50 is minimized.

Once bolt 36 is tightened and wedge-shaped section 30 is brought to press against inside edge 56 of trailer hitch tube 12, and the opposite side of insert tube 20 is brought to rest against inner surface 54 of trailer hitch tube 12, movement of the insert tube 20 within the trailer hitch tube 12 will be greatly restricted or eliminated. Although lateral movement of the trailer hitch may continue to some degree, once bolt 36 is tightened, the wedge fit of insert tube 20 within trailer hitch tube 12 will greatly restrict any movement of insert tube 20 along with pin 14.

Preferably, pin 14 is placed in position through holes 40 before bolt 36 is tightened. Once bolt 36 is tightened and wedge-shaped section 30 pulled towards tongue 22, there is little clearance left to insert pin 14. Pin 14 must be installed to ensure that the hitch assembly does not separate during use.

In the embodiment shown in FIGS. 2 and 3, a washer 28 is located between the head 26 of bolt 36 and tongue 22. This allows bolt 36 to be tightened without adversely affecting the surface of tongue 22. A compression washer is not preferred for this application, but may be employed if desired.

Wedge-shaped section 30 is preferably formed to have an angle of approximately 20–30 degrees when measured from leading edge 52 of wedge segment 30. Preferably, insert tube 20 is cut at a complementary angle from wedge-shaped segment 30. This maintains the maximum possible contact between wedge-shaped segment 30 and insert tube 20 after bolt 36 has been tightened.

Numerous greater or lesser angles between wedge-shaped section 30 and insert tube 120 may be employed. Any angle is suitable as long as the angle is sufficient to cause wedge-shaped section 30 to slip against insert tube 20 when bolt 36 is tightened.

It is also preferred that the leading edge 52 of wedge-shaped segment 30 does not extend so far as to extend past holes 40 and 42 of trailer hitch tube 12, or the mating hole 43 of insert tube 20. This minimizes the possibility that insert tube 20 would suffer reduce load bearing capabilities with the use of the present invention. For a similar reason, it is preferred that wedge-shaped section 30 does not extend more than two-thirds of the way down from the top portion of insert tube 20. This can be thought of as extending between inner wall 56 and inner wall 54 of trailer hitch tube 12.

This configuration is not desired because it would tend to weaken the load bearing characteristics of insert tube 20.

Wedge-shaped segment 30 can also be readily reconfigured and reoriented to press on one or both sides of the inside of trailer hitch tube 12 instead of the top surface 56 on the bottom surface 54 of trailer hitch tube 12.

Once the wedge-shaped segment 30 becomes wedged in place between trailer hitch tube 12 and insert tube 20, the wedge-shaped segment 30 may not release after bolt 36 has been loosened. Wedge-shaped segment 30 may also become stuck as a result of rust or corrosion. Thus, the trailer hitch insert should be lubricated to prevent rust or corrosion. It may be necessary to dislodge wedge-shaped section 30 away from tongue 22 by slightly unscrewing bolt 36, yet maintaining contact between the threads 34 of bolt 36 and threaded segment 32 of wedge-shaped section 30. Bolt 36 may then be driven towards wedge-shaped segment 30 by an impact blow delivered by a hammer or other suitable tool to the head 26 of bolt 36. For this reason, it is necessary that threaded segment 32 be securely affixed to the inner surface of wedge-shaped segment 30.

A threaded segment 32 such as a nut and bolt 36 can also be reversed. In such a configuration, the head 26 of bolt 36 is welded, braised, or otherwise attached to wedge-shaped segment 30. The threads 34 of bolt 36 will extend through tongue 22 and will point towards trailer ball 24, or other apparatus mounted on tongue 22. This nut can be tightened, pulling wedge-shaped section 30 towards tongue 22, causing wedge-shaped section 30 to press against inside edge 56 of trailer hitch 12.

This nut and bolt configuration is preferred in many applications, as the risk of deforming a nut while welding it to wedge-shaped segment 30 is significant.

In some configurations, the fit of insert tube 20 into trailer hitch tube 12 is made tighter by running a bead of welding material 58 along insert tube 20 in the region of area 50 shown in FIG. 3. The bead of welding material 58 is positioned to further reduce movement and rattling of the trailer hitch assembly. The thickness of welding material 58 is slightly less than the difference between the inner dimension of trailer hitch tube 12 and the outer dimension of insert tube 20 (approximately 1/16 of an inch).

In addition, insert tube 20 can be inverted. This would effectively raise the height of tongue 22. Ball 24 would thus be located above tongue 22 and insert tube 20. Preferably, the wedge-shaped segment 30 should be tightened against inner wall 56. This allows maximum load bearing contact against inner wall 54. If insert tube 20 shown in FIG. 3 is inverted, wedge-shaped section 30 and insert tube 20 should be configured such that wedge-shaped section 30 press against inner wall 56.

The embodiment shown in FIGS. 2 and 3 is illustrated with a trailer ball 24 in order to simplify the discussion of the present invention. It is recognized that the present invention has applications with bicycle carrier inserts, tool truck inserts, and other inserts into a trailer hitch tube. For example, FIG. 4 illustrates a bicycle rack 60 attached to insert tube 20.

The present invention is particularly useful with devices or an apparatus which may be sensitive to vibration, causing undesired movement of an attached device such as luggage rack or a bicycle rack which rack extends several feet above the trailer hitch tube itself. This type of apparatus is especially sensitive to movement of an insert tube with respect to the surrounding trailer hitch tube. A few degrees of movement as the insert tube pivots about pin 14 may have a greatly exaggerated effect on the bicycle, causing it to move several inches. This undesirable effect may cause the driver of a vehicle to become distracted, paying attention to the cargo or apparatus attached to the vehicle instead of traffic patterns and other vehicles.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An insert tube for a trailer hitch assembly comprising:
   a trailer hitch insert tube having at least one opening extending through the entire length of the trailer hitch insert tube and having proximal and distal ends;
   a wedge-shaped segment located near the distal end of said tube;
   engagement means disposed between the wedge-shaped segment and the trailer hitch insert tube for drawing the wedge-shaped segment towards the trailer hitch insert tube; and
   said distal end of said trailer hitch insert tube having a shape substantially complementary to the shape of said wedge-shaped segment.

2. The device as described in claim 1 wherein the engagement means comprises a threaded segment affixed to said wedge-shaped segment and a bolt extending through said tongue, through said tube, and threaded into said threaded segment.

3. The device as described in claim 1 and further comprising at least one opening extending laterally through the sides of said trailer hitch insert tube at a point between the proximal and distal end of said trailer hitch insert tube.

4. The device as described in claim 1 in which said wedge-shaped segment extends less than halfway from the distal end of said trailer hitch insert tube to the proximal end of said trailer hitch insert tube.

5. The device as described in claim 4 in which said trailer hitch insert tube further has a top and bottom and sides;
   said wedge-shaped segment located along the top portion of said trailer hitch insert tube.

6. The device as described in claim 5 in which the wedge-shaped segment extends less than two-thirds of the way from the top of said trailer hitch insert tube to the bottom of said trailer hitch insert tube.

7. The device as described in claim 1 and further comprising a tongue having a substantially flat segment substantially parallel to said trailer hitch insert tube, said substantially flat portion of said tongue further having at least one fitting extending through said tongue in a direction substantially perpendicular to the substantially flat surface of said tongue; said tongue also having at least one attachment point where said tongue is affixed to the proximal end of said trailer hitch insert tube.

8. The device as described in claim 7 and further comprising a trailer hitch ball having a ball segment and an attachment segment, affixed through said fitting in said tongue.

9. The device as described in claim 1 and further comprising carrying means affixed to the proximal end of said trailer hitch insert tube.

10. The device as described in claim 9 in which said carrying means further comprises a bicycle rack affixed to the proximal end of said trailer hitch insert tube.

11. A trailer hitch comprising:
    an outer trailer hitch tube having a predetermined height and width;
    an inner trailer hitch tube having a height and width slightly less than the height and width of said outer trailer hitch tube, said inner trailer hitch tube having at least one opening extending substantially the entire length of said inner trailer hitch tube, said inner trailer hitch tube having first and second ends;
    a wedge shaped segment located near said second end of said inner trailer hitch tube, said wedge-shaped segment having inner and outer portions, said outer portion of said wedge-shaped segment having dimensions substantially conforming to the dimensions of the adjacent inner trailer hitch tube;
    said second end of said inner trailer hitch tube having a shape substantially complementary to the shape of said wedge-shaped segment; and
    engagement means disposed between the wedge-shaped segment and the trailer hitch insert tube for drawing the wedge-shaped segment towards the trailer hitch insert tube.

12. The device as described in claim 11 wherein the engagement means comprises at least one threaded segment affixed to the inner surface of said wedge-shaped segment and at least one bolt having at least a partial threaded section whose threads complement the threads of said threaded segment, said bolt extending through said opening from the first end of said inner trailer hitch tube towards said second end of said inner trailer hitch tube.

13. The device as described in claim 11 in which said bolt is threaded into said threaded segment.

14. The device as claimed in claim 13 and further comprising carrying means affixed to said first end of said inner trailer hitch tube.

15. The device as described in claim 14 in which said carrying means further comprises a ball-type trailer hitch attachment.

16. The device as described in claim 14 in which said carrying means further comprises a bicycle rack.

17. The device as described in claim 12 in which said wedge-shaped segment is located along the top portion of said inner trailer hitch tube and having first and second positions, said first position of said wedge-shaped segment having said outer portion of said wedge-shaped segment substantially coplanar with the adjacent portion of said inner trailer hitch tube, said second position of said wedge-shaped segment having at least a portion of said wedge-shaped segment located beyond the outer dimension of said inner trailer hitch tube, the position of said bolt determining whether said wedge-shaped segment is located in said first position or said second position.

18. The device as described in claim 11 in which said inner trailer hitch tube further has a top and bottom and wherein said wedge-shaped segment is located substantially adjacent to the top portion of said inner trailer hitch tube.

19. The device as described in claim 18 in which said wedge-shaped segment extends less than two-thirds of the way from the top of said inner trailer hitch tube towards the bottom of said inner trailer hitch tube.

* * * * *